United States Patent [19]
Singh et al.

[11] Patent Number: 5,504,615
[45] Date of Patent: Apr. 2, 1996

[54] ACOUSTO-OPTIC DEVICES UTILIZING THALLIUM ARSENIC SULFIDE ($Tl_3AsS_3$) CRYSTALS

[75] Inventors: Narsingh B. Singh, Export; Milton S. Gottlieb, Churchill; James P. McHugh, Wilkins Twp.; Robert Mazelsky, Monroeville, all of Pa.

[73] Assignee: Westinghouse Electric Corporation, Pittsburgh, Pa.

[21] Appl. No.: 165,291

[22] Filed: Dec. 13, 1993

[51] Int. Cl.⁶ .................................. G02F 1/11; G02F 1/33
[52] U.S. Cl. ........................... 359/285; 359/305; 359/308
[58] Field of Search ................................. 359/308, 305, 359/285, 885

[56] References Cited

U.S. PATENT DOCUMENTS

| | | | |
|---|---|---|---|
| 3,733,499 | 5/1973 | Deis et al. | 310/306 |
| 3,792,287 | 2/1974 | Roland et al. | 359/328 |
| 3,799,659 | 3/1974 | Roland et al. | 359/285 |
| 3,915,556 | 11/1975 | Roland et al. | 359/305 |
| 3,958,863 | 5/1976 | Isaacs et al. | 359/305 |
| 4,653,869 | 3/1987 | Gottlieb et al. | 359/308 |
| 4,955,699 | 9/1990 | Singh et al. | 359/285 |

OTHER PUBLICATIONS

Singh, N. B., et al. "Growth And Characterization Of Thallium Arsenic Selenide Crystals For Nonlinear Optical Applications", *Progressive Crystal Growth and Characteristics*, vol. 20, pp. 175–188, 1990.

Feichtner, J. D. and Roland, G. W., "Optical Properties of a New Nonlinear Optical Material: $Tl_3AsSe_3$", *Applied Optics*, vol. 11, No. 5, May, 1972.

*Primary Examiner*—Paul M. Dzierzynski
*Assistant Examiner*—Audrey Chang

[57] ABSTRACT

Acousto-optical devices utilize crystals of a novel material thallium arsenic sulfide ($Tl_3AsS_3$) grown from a melt. A $Tl_3AsS_3$ crystal is cut and parallel faces are prepared and polished. A piezoelectric transducer connected to an RF generator is placed on the acoustic face to generate sound waves. The light is directed through the optical face of the crystal and interacts with the acoustic waves. These devices may be used in signal processing, spectrum analyzing, spectroscopic, liquid analyzing and spectral imaging systems.

4 Claims, 2 Drawing Sheets

ACOUSTO-OPTIC DEVICES UTILIZING THALLIUM ARSENIC SULFIDE (T1ASS$_3$) CRYSTALS

FIELD OF THE INVENTION

The invention relates to acousto-optic devices that contain crystals such as delay lines, filters, RF spectrum analyzers and two-dimensional laser beam scanners.

BACKGROUND OF THE INVENTION

Twenty five years ago it was discovered that a sound wave in the lithium niobate crystal can diffract and rotate the plane of polarization of a polarized light beam with high efficiency up to high frequency. The advances in the high frequency acoustic techniques and laser technology have put many applications into reality from these phenomena and a variety of acousto-optic devices such as acoustic delay lines, acousto-optic tunable filters, modulators and display devices could be built. These devices require unique properties to achieve high performance. For example, a high performance signal-processing device is characterized by a large information processing capability measured by the time bandwidth product of the device. For an acousto-optic Bragg cell, the large time bandwidth product is achieved by extremely wide band operation and long time delay. The properties that make any material important are (a) spectral transmission range, (b) photo-elastic coefficient, (c) acousto-optic figure of merit, (d) acoustic velocity, and (e) acoustic attenuation. The acousto-optic figure of merit for a material is defined as:

$$M_2 = n^6 \cdot p^2 / d \cdot v^3 \qquad (1)$$

where n is the refractive index, p is the photo-elastic constant, d is the density and v is the acoustic velocity. The figure of merit $M_2$ is the measure of diffracted light efficiency for a given power. For a good candidate material the refractive index and photoelastic coefficient should be high and density and acoustic velocity and acoustic attenuation should be very low.

Several materials have been proposed and used for acousto-optic devices. Although some of these materials are suitable for certain applications each has limitations. For example, commercially available crystal lithium niobate, tellurium dioxide and lead molybdate are not suitable for light beams in the 0.9 to 10 micrometer wave length region.

SUMMARY OF THE INVENTION

We provide acousto-optic devices comprised of thallium arsenic sulfide (Tl$_3$AsS$_3$) crystals. We have found that Tl$_3$AsS$_3$ is a stable material, large crystals can be grown and it is very good crystal for useful and important optical devices. The crystals of Tl$_3$AsS$_3$ transmit between 0.9 to 10 micrometer wavelength region. The crystals have low acoustic velocity (1.18×10$^5$ cm/s) which translates into a high acousto-optic figure of merit. Large crystals can be easily grown and crystals have excellent fabrication characteristics. These crystals are suitable for use in several classes of acousto-optic systems. For example, we have developed an acousto-optic delay line and signal processing system, an acousto-optic tunable filter, an RF spectrum analyzer and a two dimensional laser beam scanner, all of which use a Tl$_3$AsS$_3$ crystal.

Other objects and advantages of the present invention will become apparent from a description of certain preferred embodiments thereof shown in the accompanying drawings:

DESCRIPTION OF THE PREFERRED EMBODIMENTS

All of our acousto-optic devices utilize Tl$_3$AsS$_3$ crystals. Before describing certain present preferred embodiments of these devices we will describe how this crystal is grown and prepared.

A. Crystal growth and characterization

The crystal growth of Tl$_3$AsS$_3$ involves the preparation and mixture of elements Tl, As and S, and growth of a crystal. The thallium arsenic sulfide mixture is prepared by mixing the purified parent elements in stoichiometric composition. The mixture is then evacuated in a well cleaned quartz tube and homogenized by melting and maintaining it in the molten state for several hours. The mixture is then cooled. The solidified ingot is removed from the quartz tube, and placed in a well cleaned Bridgman growth tube. We used a capillary tube for seeding the crystal. We prefer that the crystal growth be carried out in a two zone vertical furnace. The top zone of the furnace was maintained at 550° C. and the cold zone is maintained at 150° C. We grow our crystals at the thermal gradient of 30 K/cm using a growth speed of 1 cm/day.

The crystals of this invention are hexagonal, birefringent, anisotropic and have good mechanical fabricability. The crystal has a sharp melting point at 326° C. The crystal class was confirmed by X-ray diffraction and crystals were oriented by X-ray Laue method. Our crystals have hexagonal symmetry. The crystals we have made have lengths of the a and c axes of 6.99 A and 9.57 A, respectively. The acoustic velocity of our crystal was measured by cutting and polishing a 1 cm$^3$ cube crystal. The crystal was optically polished on all the faces for evaluation. We found that our crystal transmitted light beams of between 0.9 to 10 micrometer wavelength without any absorption band. A lithium niobate crystal was used as a transducer. The crystal was bonded to the transducer by UV cure cement. The ratio of the acoustic velocities in the longitudinal and slow shear direction was identical to that of thallium arsenic selenide, a popular acousto-optic material. The slow shear velocity of Tl$_3$AsS$_3$ crystal is 1.18×10$^5$ cm/s. This velocity translates into a very favorable acousto-optic figure of merit.

Based upon this data it is apparent that this crystal can be used interchangeably with the thallium arsenic selenide crystals of the prior art. Yet, our crystal is easier to fabricate and can operate in the near infrared, beyond the cut-off wavelength of thallium arsenic selenide crystals. Furthermore, our Tl$_3$AsS$_3$ crystal should show very good characteristics for the second harmonic and the higher harmonic generation of optical parametric oscillation applications also by virtue of its nonlinearity, fabricability and potentially higher damage threshold.

B. Delay lines for signal processing

Figure 1:
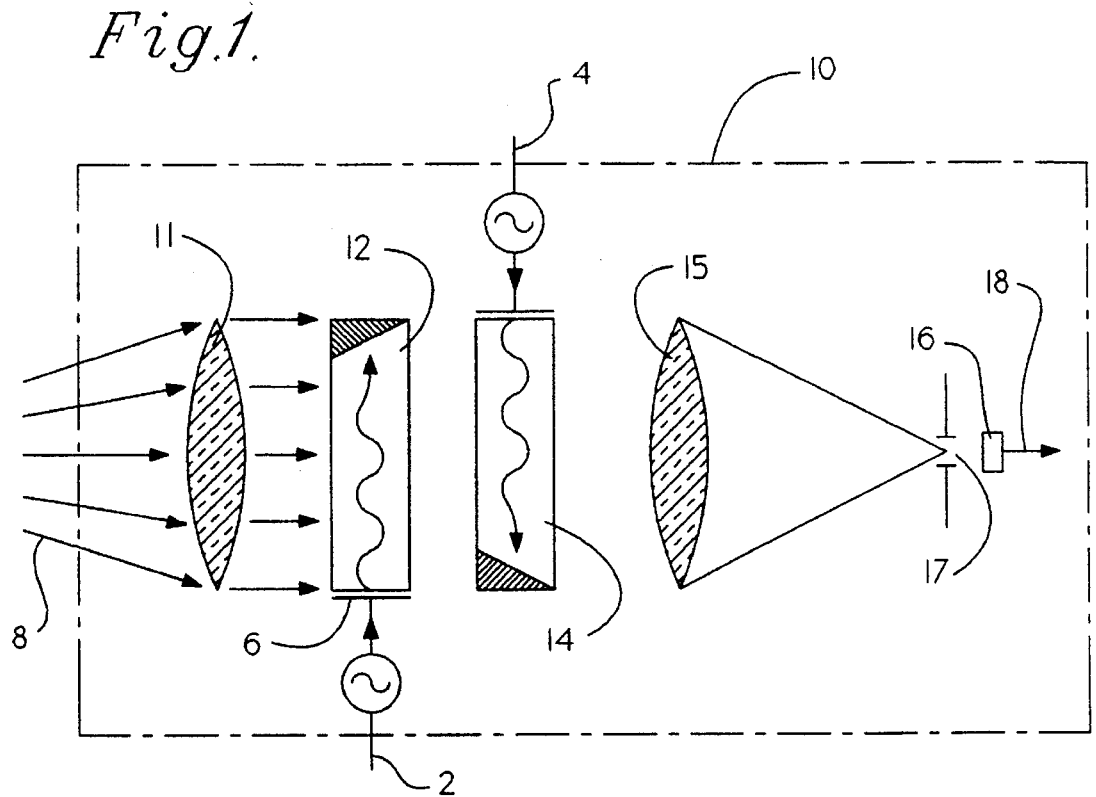
FIG. 1 is a diagram of an acousto-optic delay line and signal processing system containing a Tl$_3$AsS$_3$ crystal.

A typical application of acousto-optic delay lines in a signal processing unit 10 is shown in FIG. 1. In this system, a known signal waveform, such as a radar signal 2, is converted into an acoustic wave by the transducer 6, and propagates in the first acousto-optic cell 12, or delay line. A time reversed "replica" 4 of this same signal is propagated in the second delay line 14. Both delay lines 12 and 14 are $Tl_3AsS_3$ crystals. A laser beam 8 is expanded and then directed by lens 11 to fill the aperture of these cells. The light that is modulated by this delay line pair is focused by lens 15 through aperture 17 onto a photo-detector 16. The optical signal 18 thus produced is the auto-correlation function of the signal, which has the property of detecting the signal with optimum signal to noise ratio.

C. Tunable optical Filters

Figure 2:
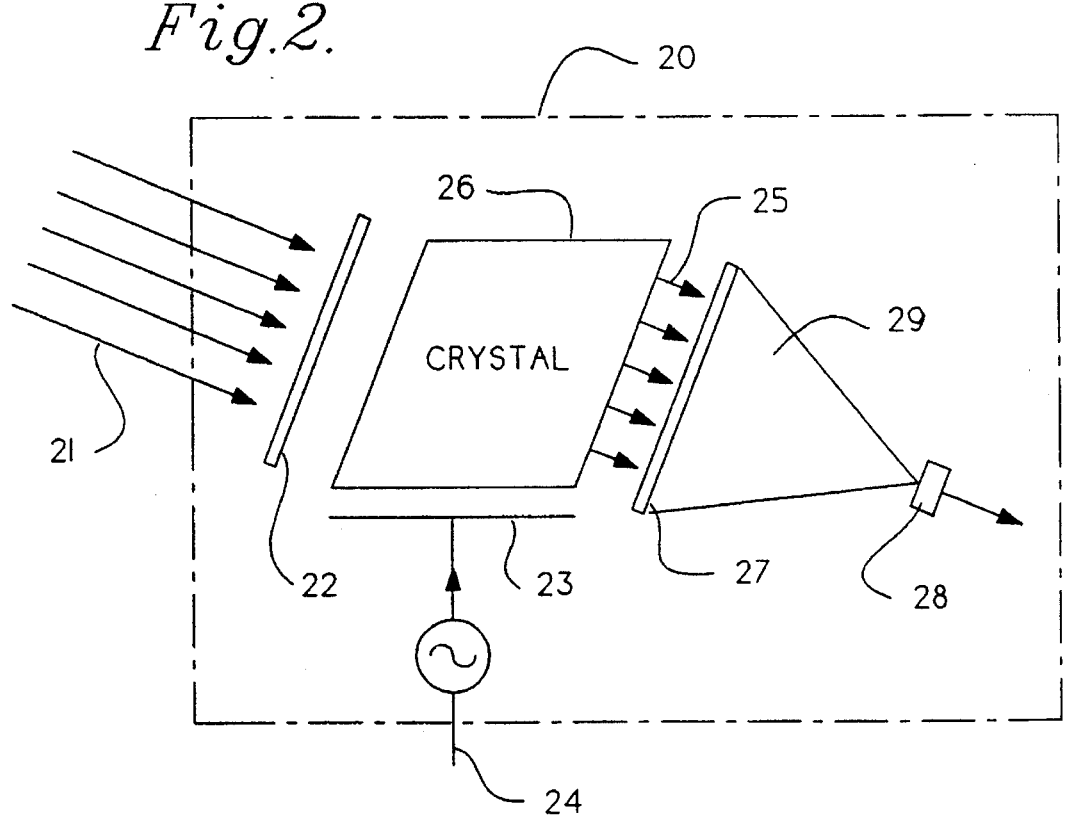
FIG. 2 is a diagram of an acousto-optic tunable filter (AOTF) containing a Tl$_3$AsS$_3$ crystal.

An acousto-optic tunable filter unit 20 is shown in FIG. 2. This device has the property of analyzing, or filtering, an incident beam of light 21 of unknown spectral composition. It does this by diffracting light of a given wavelength when acoustic waves 24 of a defined frequency propagate into the $Tl_3AsS_3$ crystal 26. There is a unique relationship between the acoustic wavelength of wave 24 and the filtered optical wavelength of the filtered beam 25 so the passband of the filter can be electronically controlled. The incident beam 21 passes through polarizer 22 into crystal 26. Acoustic wave 24 passes through transducer 23 and causes crystal 26 to emit a filtered beam 25 of a selected wavelength correlated to the wavelength of wave 24. The light at the selected wavelength undergoes rotation of its plane of polarization in a polarization analyzer 27 at the output face of the crystal 26. Hence, only the filtered beam 29 will reach the photo-detector 28.

D. RF spectrum analyzers

Figure 3:
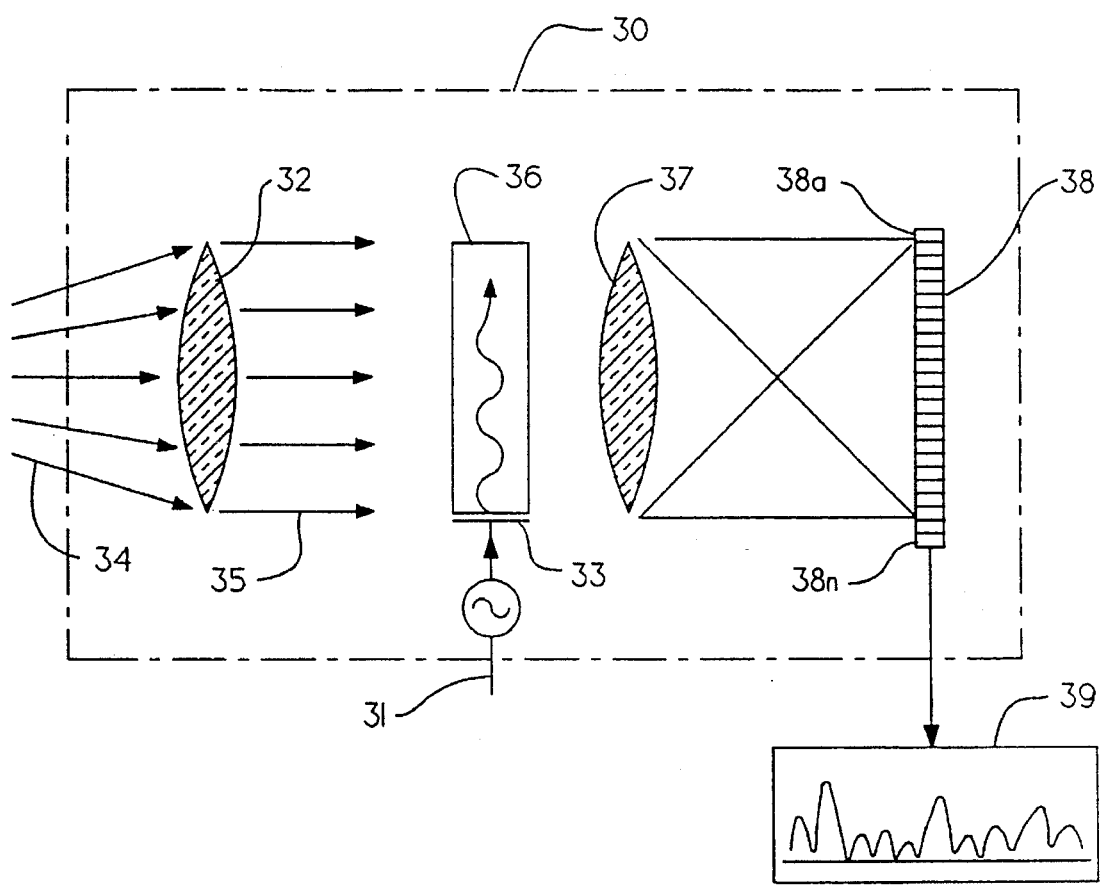
FIG. 3 is a diagram of a RF spectrum analyzer which utilizes a Tl$_3$AsS$_3$ crystal.

An acousto-optic RF spectrum analyzer 30 is shown in FIG. 3. In this system, an unknown RF signal 31 which has been received is analyzed by transforming it into an acoustic disturbance by the transducer 33. The cell aperture is illuminated by a laser beam 34 which has passed through lens 32. The light 35 is diffracted in crystal 36 by the signal's acoustic disturbance and is focused by lens 37 onto a photo-detector array 38. Each frequency component of the RF signal 31 diffracts light to a different angle, such that the line falls on different element 38*a* through 38*n* of the array 38. Thus, the readout of the array is the same as the frequency composition, or Fourier transform, of the unknown signal shown in box 39.

E. Two dimensional laser beam scanners

Figure 4:
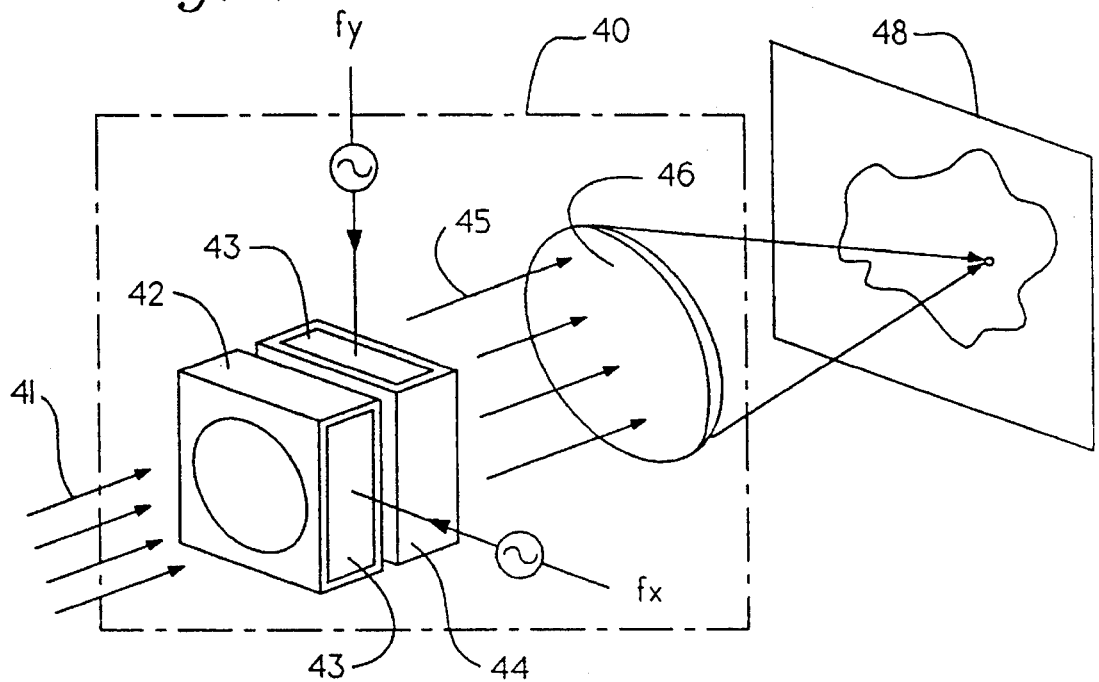
FIG. 4 is a diagram two-dimensional laser beam scanner which utilizes a Tl$_3$AsS$_3$ crystal.

An acousto-optic, two-dimensional laser beam scanning system 40 is shown in FIG. 4. Such a system may be used to generate an image raster, such as for television, or for random access beam pointing as in laser radar. It consists of two acousto-optic cells 42 and 44 with transducer faces 43 on each, orthogonal to each other. This gives rise to the capability to independently select the X- and Y- beam directions, so that any point in a two-dimensional space can be accessed by selecting a chosen pair of acoustic frequencies $f_y$ and $f_x$. A beam 45 is emitted from cell 44 and focused by lens 46 onto a screen 48 or other display or sensing surface. This can be done in a raster, by linearly sweeping the X-axis, or random access by selecting X and Y frequency pairs. In the raster version, an image is written by suitably controlling the intensity or the acoustic wave as it is scanned along the X-axis.

EXAMPLE

The following example further illustrates this invention. As supplied thallium and sulfur were purified in our laboratory. Thallium, arsenic and selenium were weighed in 3:1:3 stoichiometric ratio. The exact weight for the thallium, arsenic and selenium was 101.5, 12.4 and 15.9 grams respectively. The materials were placed in a well cleaned quartz tube, evacuated and sealed. The elements were reacted by placing the tube well above 700° C. for several hours. The reacted charge was then cooled and placed in a 11×13 mm diameter tube and the crystal was grown in a Bridgman geometry. The nucleation was started by a 2 mm diameter capillary tube. The growth tube was passed through the temperature gradient at the rate of 1 cm/day. After the crystal growth was completed, the crystal was taken out of the quartz tube by dissolving the tube in hydrofluoric acid. The crystal was cut, polished in the 1 cm³ dimension and its properties were examined for acousto-optic devices.

An acoustic-optic turnable filter was fabricated to prove the proof of concept in the following manner. The $Tl_3AsS_3$ crystal was cut and optically polished. A one centimeter cube was fabricated in b, c and a planes. A lithium niobate transducer was used to generate RF frequency. The slow shear velocity of the material was $1.18 \times 10^5$ cm/s. The filter showed good performance because of its favorable properties needed for acoustic-optic devices.

Although we have described certain present preferred embodiments of our acousto-optic devices, it should be distinctly understood that our invention is not limited thereto, but may be variously embodied within the scope of the following claims.

We claim:

1. An improved acousto-optic device of the type which utilizes at least one crystal wherein the crystal is comprised of $Tl_3AsS_3$.

2. The improved acousto-optic device of claim 1 wherein the acoustic-optic device is selected from the group consisting of acousto-optic delay lines, acousto-optic filters, RF spectrum analyzers and acousto-optic two-dimensional laser beam scanners.

3. The improved acousto-optic device of claim 2 wherein the acoustic-optic device is an acousto-optic tunable filter comprised of at least one $Tl_3AsS_3$ crystal and a lithium niobate transducer.

4. The improved acousto-optic device of claim 1 wherein the crystal can transmit wavelengths between 0.9 and 10 micrometers.

* * * * *